US008515646B2

(12) United States Patent
Sata et al.

(10) Patent No.: US 8,515,646 B2
(45) Date of Patent: Aug. 20, 2013

(54) CONTROL APPARATUS FOR INTERNAL COMBUSTION ENGINE

(75) Inventors: Kota Sata, Susono (JP); Yasuhiro Oi, Numazu (JP); Shinichi Soejima, Gotemba (JP); Koichi Ueda, Susono (JP); Shuntaro Okazaki, Sunto-gun (JP); Satoshi Yoshizaki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/257,792

(22) PCT Filed: Feb. 25, 2010

(86) PCT No.: PCT/JP2010/052967

§ 371 (c)(1),
(2), (4) Date: Sep. 20, 2011

(87) PCT Pub. No.: WO2011/104844

PCT Pub. Date: Sep. 1, 2011

(65) Prior Publication Data

US 2012/0316750 A1 Dec. 13, 2012

(51) Int. Cl.
*G05D 1/00* (2006.01)

(52) U.S. Cl.
USPC ........................... 701/101; 701/29.2; 701/110

(58) Field of Classification Search
USPC .................. 701/1, 29.2, 30.7, 31.6, 101, 106, 701/110, 114, 115
See application file for complete search history.

(56) References Cited

U.S. PATENT DOCUMENTS

| | | | | |
|---|---|---|---|---|
| 5,588,937 | A * | 12/1996 | Kono et al. | 477/169 |
| 6,814,035 | B2 * | 11/2004 | Eiraku | 123/90.11 |
| 7,137,367 | B2 * | 11/2006 | Tanei | 123/90.15 |

FOREIGN PATENT DOCUMENTS

| | | |
|---|---|---|
| JP | A-2004-52769 | 2/2004 |
| JP | A-2008-169825 | 7/2008 |
| JP | A-2009-162199 | 7/2009 |
| JP | A-2009-162200 | 7/2009 |
| WO | WO 2011/086679 A1 | 7/2011 |

OTHER PUBLICATIONS

International Search Report in International Application No. PCT/JP2010/052967; dated Mar. 23, 2010 (with English-language translation).

* cited by examiner

*Primary Examiner* — John Kwon
(74) *Attorney, Agent, or Firm* — Oliff & Berridge, PLC

(57) ABSTRACT

A control apparatus of an internal combustion engine capable of appropriately reflecting various requests relating to the performance of the internal combustion engine. Specifically, the control device of the internal combustion engine acquires various requests relating to the performance of the internal combustion engine, and sets restricted ranges of the value of the control variable in accordance with the details of the requests. At this moment, the control device temporally changes the set restricted ranges for specific requests associated with the time integral value of the control variable rather than the instantaneous value of the control variable. Subsequently, the control device determines a final restricted range on the basis of the overlap between the restricted ranges set for each request, and determines the target value of the control variable in the final restricted range.

15 Claims, 2 Drawing Sheets

CONTROL APPARATUS FOR INTERNAL COMBUSTION ENGINE

TECHNICAL FIELD

The present invention relates, in general, to control apparatuses for controlling internal combustion engines according to target values of control amounts and, more particularly, to a control apparatus that, in setting a target value of a control amount, can incorporate various types of requirements concerned with performance of an internal combustion engine in the target value.

BACKGROUND ART

Various types of performance aspects including, for example, driveability, exhaust emissions performance, and a fuel consumption rate, are required of an internal combustion engine for automobiles. Receiving requirements concerned with these aspects of performance issued from a controller for controlling an entire vehicle, a control apparatus for the internal combustion engine controls control amounts for the internal combustion engine so as to satisfy these requirements. In reality, however, it is difficult to achieve completely all of these requirements simultaneously. Thus, a technique needs to be devised for properly incorporating the requirements of various types in the control amounts for the internal combustion engine.

JP-A-2009-162199 discloses an example of such a technique. A control apparatus for an internal combustion engine as disclosed in this publication incorporates various types of requirements in control amounts for the internal combustion engine by performing mediation of requirements. In the mediation of requirements, each of the requirements is first expressed by a predetermined physical quantity. The physical quantities herein used are to be used as the control amounts for the internal combustion engine, including, for example, torque, efficiency, and an air-fuel ratio. Efficiency refers to a ratio of torque actually outputted to torque to be potentially outputted by the internal combustion engine. Next, values of requirements expressed by the same physical quantity are collected. A predetermined calculation rule is then applied to determine a single value from the plurality of requirement values. This process of determination is called the mediation.

The "mediation of requirements" is based on an assumption that all requirements to be mediated are expressed by the same physical quantity, or more precisely, a physical quantity used as a control amount. Accordingly, each of all requirements outputted from the vehicle controller to the control apparatus for the internal combustion engine should be expressed in a form of a requirement value of the control amount. It is, however, conceivable that taking the form a particular control amount is not necessarily appropriate depending on the type or details of the requirement. In such cases, the requirement may not be appropriately incorporated in the target value of the control amount.

Among the requirements concerned with performance of the internal combustion engine, some may be appropriately expressed by a time-integrated value, instead of an instantaneous value, of the control amount. A good example of such requirements is a requirement concerned with exhaust emissions performance during cold starting. The exhaust emissions performance during cold starting depends on an activated state of a catalyst. An exhaust emissions temperature or efficiency relating thereto may therefore be used as the control amount to incorporate the requirement. Note, however, that it is the time-integrated value of the exhaust emissions temperature that affects the activated state of the catalyst and the exhaust emissions temperature varying from one time to another does not change greatly the activated state of the catalyst. Consequently, where feasible, the time-integrated value of the exhaust emissions temperature is preferably used as the requirement value of the control amount in terms of the exhaust emissions performance during cold starting.

However, in actual control procedures, it is the instantaneous value of the control amount that the control apparatus can mediate. Even if the time-integrated value of the control amount is outputted as a requirement, the control apparatus is unable to mediate the requirement with others. When the "mediation of requirements" is performed, therefore, a requirement can be outputted only in the form of the instantaneous value of the control amount, even if the requirement is appropriately to be represented by a time-integrated value. This results in the following. Specifically, in mediation based on a comparison made in terms of instantaneous values, a requirement is placed in a lower priority than the others even though the requirement should be given priority, so that the requirement is not incorporated at all in a final mediated value, specifically, the target value of the control amount. In contrast, a requirement having a relatively low priority is given too high a priority as a result of mediation based on a comparison made in terms of instantaneous values. This may hamper other requirements to be given priority from being incorporated in the target value of the control amount.

To control the internal combustion engine appropriately, it is necessary to incorporate also requirements concerned with the time-integrated value of the control amount appropriately in the target value of the control amount, in addition to requirements concerned with the instantaneous value of the control amount.

SUMMARY OF THE INVENTION

The present invention has been made in view of the foregoing situations and it is an object of the present invention is to provide a control apparatus for an internal combustion engine, the control apparatus being capable of appropriately incorporating various types of requirements concerned with performance of the internal combustion engine, in particular, a requirement concerned with a time-integrated value of a control amount rather than an instantaneous value of the control amount in a target value of the control amount, and not requiring that such requirements be expressed in a form of a requirement value of the control amount.

To achieve the foregoing object, a first aspect of the present invention provides a control apparatus for an internal combustion engine, in which various types of requirements concerned with performance of the internal combustion engine are acquired and a restricting range of values of a control amount is set according to a specific detail of each requirement. At this time, the set restricting range is varied with time for specific requirements concerned with a time-integrated value of the control amount rather than an instantaneous value of the control amount. Next, the control apparatus determines a final restricting range based on overlaps between restricting ranges set for the requirements and determines a target value of the control amount, which falls within the final restricting range.

In the above-described aspect of the present invention, the various types of requirements concerned with performance of the internal combustion engine are converted to a form of the restricting ranges of values of the control amounts and incorporated in the target values of the control amounts via restriction imposed by the restricting ranges. For this reason, each of the requirements does not have to be expressed in the form of the requirement value of the control amount in advance. In addition, for the specific requirements mentioned above, the restricting range is forced to be varied with time. This helps inhibit the restricting range from being excessively stringent or excessively relaxed continuously as compared with priority of the requirement in terms of the time-integrated value. Thus, all requirements including not only those concerned with the instantaneous value of the control amount, but also those concerned with the time-integrated value of the control amount can be appropriately incorporated into the target values of the control amounts.

In the above-described aspect of the present invention, a method of varying with time a restricting level that specifies the restricting range may be employed as a method of varying the restricting range with time for the specific requirements mentioned above. Specifically, the following eight methods are particularly preferred.

First preferred method: A restricting level is determined by random numbers and, for a holding time predetermined for each of restricting levels, the restricting range is held at the determined restricting level.

Second preferred method: A restricting level is determined by random numbers, a holding time is determined according to the determined restricting level and a time-integrated value of an output value of the control amount, and the restricting range is held at the determined restricting level for the determined holding time.

Third preferred method: The restricting level is varied according to the time-integrated value of an evaluation index set according to the restricting level.

Fourth preferred method: The restricting level is varied according to the time-integrated value of the output value of the control amount.

Fifth preferred method: Based on each history of the restricting level and its holding time, the subsequent restricting level and its holding time are determined.

Sixth preferred method: Based on the time-integrated value of the output value of the control amount, the subsequent restricting level and its holding time are determined.

Seventh preferred method: Based on each history of the restricting level and its holding time, and the time-integrated value of the output value of the control amount, the subsequent restricting level and its holding time are determined.

Eighth preferred method: The restricting level is varied according to a schedule prepared in advance.

Ninth preferred method: The schedule of the restricting level is updated according to a controlled state of the internal combustion engine and the restricting level is varied according to that schedule.

The abovementioned nine methods are exemplified as particularly preferred methods and it should be understood that the exemplification does not mean to preclude other methods from the scope of the present invention.

Additionally, when the restricting level is varied with time, the restricting level may be varied among a plurality of restricting level candidates set discretely or within a restricting level range set continuously.

Further, a reference restricting range may be set for varying the restricting range with time. For example, the most stringent restricting range may be set as the reference, in which case, the restricting range may be varied with time toward a relaxing direction. Conversely, the restricting range may be varied with time toward a stringent direction with reference to the most relaxed restricting range.

MODES FOR CARRYING OUT THE INVENTION

First Embodiment

A first embodiment of the present invention will be described with reference to FIGS. 1 and 2.

A control apparatus according to the first embodiment of the present invention is an engine controller applied to an internal combustion engine for an automobile (hereinafter referred to as an "engine"). Types of the engine to which the controller is applied are not limited. Examples of applicable engines include, but not limited to, spark ignition engines, compression ignition engines, four-stroke engines, two-stroke engines, reciprocating engines, rotary engines, single-cylinder engines, and multi-cylinder engines. The engine controller of this embodiment controls one or more actuators included in such an engine, for example, a throttle, an ignition device, or an injector, according to a target value of an engine control amount.

Figure 1:
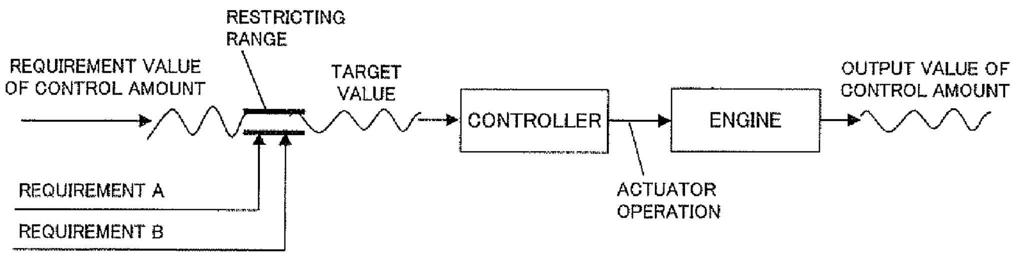
FIG. 1 is a block diagram illustrating a configuration of a control apparatus for an internal combustion engine according to a first embodiment of the present invention.

FIG. 1 is a block diagram showing arrangements of the engine controller of this embodiment. The engine controller is supplied with a requirement value of the engine control amount from a vehicle controller for controlling an entire vehicle. The requirement value represents any one of the various types of requirements concerned with engine performance, including driveability, exhaust emissions performance, and fuel consumption rate, and is expressed by the engine control amount. The vehicle controller for controlling the entire vehicle also supplies the engine controller with a plurality of other requirements concerned with engine performance. The plurality of other requirements includes requirements concerned with a time-integrated value of the control amount rather than an instantaneous value of the control amount. One specific example of these is a requirement concerned with exhaust emissions performance during cold starting. The engine controller determines a target value of the control amount based on the requirement value of the control amount supplied thereto. The engine controller then operates various types of actuators concerned with the control amount concerned according to the determined target value and varies an output value of the control amount concerned through operations of the actuators.

The various requirements concerned with the engine performance supplied to the engine controller together with the requirement value of the control amount are taken into consideration in a process of determining the target value from the requirement value of the control amount. These requirements are converted to a form of a restricting range of values of the control amount defined by an upper limit value and a lower limit value as shown in FIG. 1 and, via restriction imposed by the restricting range, incorporated in the target value of the control amount. Particularly noteworthy here is that only one restricting range is used to determine the target value, though the plurality of requirements is supplied. This means that all requirements are incorporated in this single restricting range. A method of determining the restricting range of values of the control amount from the various requirements concerned with the engine performance will be described below in detail.

Figure 2:
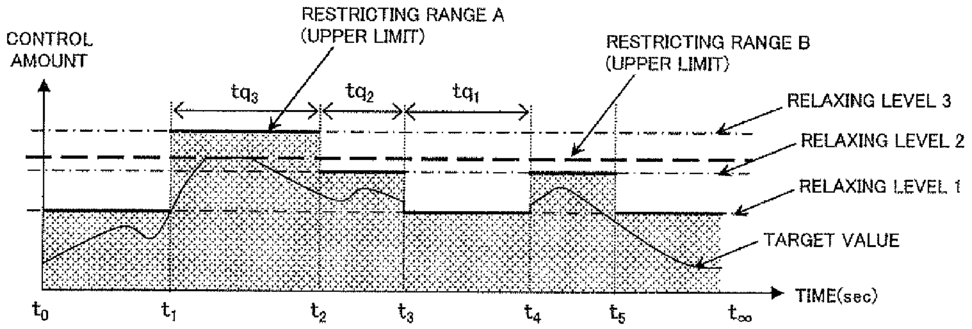
FIG. 2 is a diagram for illustrating the method of determining a restricting range adopted in the first embodiment of the present invention.

FIG. 2 is a diagram for illustrating the method of determining the restricting range adopted in this embodiment. Referring to the graph shown in FIG. 2, the ordinate represents values of the control amount, while the abscissa represents time. Drawn in this graph are lines indicating upper limits of restricting ranges A and B of values of the control amount. Each of the restricting ranges A and B is converted from a corresponding one of different types of requirements. Specifically, one restricting range is obtained from one requirement. Assume here that the restricting range A is converted from a requirement A and the restricting range B is converted from a requirement B. Note that each of the restricting ranges A and B has a lower limit which is, however, here omitted.

The requirements A and B are concerned with their own specific details. The requirement B is concerned with an instantaneous value of the control amount. Thus, the restricting range B converted from the requirement B remains constant regardless of time as long as the detail of the requirement B remains unchanged. Specifically, as shown by a thick broken line in the graph, a restricting level (the upper limit in this case) that defines the restricting range B is held at a constant value regardless of time.

The requirement A is concerned with a time-integrated value of the control amount rather than the instantaneous value of the control amount. As shown by a thick solid line in the graph, the restricting range A converted from the requirement A is varied with time. More specifically, the restricting level that defines the restricting range A is varied with time among three levels set discretely. Of these three restricting levels, a level 1 which is the most stringent serves as a reference and the restricting range A is relaxed in order of levels 2 and 3. Specifically, the levels 1, 2, and 3 represent levels of relaxation from the restricting range A. The levels 1, 2, and 3 will hereunder be referred to as relaxing levels. The most stringent relaxing level 1 corresponds, for example, to the restricting level when the requirement A is expressed by an instantaneous value of the control amount.

The target value of the control amount is indicated by a thin solid line in the graph of FIG. 2. A final restricting range is defined by redefining the restricting ranges such that the final restricting range has the more stringent upper limit between the upper limits of the restricting ranges A and B. The requirement value of the control amount is restricted by this final restricting range to thereby be set as the target value of the control amount. As such, the various requirements concerned with the engine performance are converted to a plurality of restricting ranges, each having a unique degree of stringency different from each other. The requirements are then incorporated in setting the target value via the restriction imposed by the final restricting range determined based on overlaps between the restricting ranges. Accordingly, each requirement does not have to be expressed by the form of the requirement value of the control amount in advance.

Additionally, as is known from the graph of FIG. 2, for the requirement A concerned with the time-integrated value of the control amount, the restricting range A is not fixed, being varied with time. This helps inhibit the restricting range A from being excessively stringent or excessively relaxed continuously as compared with priority of the requirement A in terms of the time-integrated value. For this reason, it is not likely that the target value of the control amount will be restricted only by the restricting range A or the target value of the control amount will be restricted only by the restricting range B. Specifically, according to the method of determining the restricting range adopted in the embodiment, not only the requirement B concerned with the instantaneous value of the control amount, but also the requirement A concerned with the time-integrated value of the control amount can be appropriately incorporated into the target value of the control amount.

A method of varying the relaxing level of the restricting range A with time will be described below.

In this embodiment, the relaxing level is determined by random numbers. Specifically, random numbers that take a value of 1, 2, or 3 are generated and a relaxing level n is then determined by a generated numeric value n. For example, if "2" is yielded as a result of random number generation, specifically, if n=2, then the relaxing level n is determined to be the relaxing level 2.

A relaxing time $tq_n$ is set for each relaxing level n. The restricting range A is held at the determined relaxing level n for a period of time through which the relaxing time $tq_n$ lapses. In the example shown in FIG. 2, a relaxing time $tq_3$ of the relaxing level 3 is the longest, followed by a relaxing time $tq_1$ of the relaxing level 1. A relaxing time $tq_2$ of the relaxing level 2 is set to be the shortest. Each of the relaxing times $tq_1$, $tq_2$, and $tq_3$ is a fixed value. A subsequent relaxing level $n_{k+1}$ is determined before change timing to come next. Let $t_{k,n}$ be timing at which a change is made to a current relaxing level $n_k$ and $t_{k+1,n}$ be timing at which a change is made to the subsequent relaxing level $n_{k+1}$. A relationship between the two is expressed by the following equation.

$$t_{k+1,n}=t_{k,n}+tq_n \quad \text{[Expression 1]}$$

According to the method employed in this embodiment, the relaxing level of the restricting range A can be varied with time, while a calculating load on the engine controller is kept substantially low.

While there are three relaxing levels in the example shown in FIG. 2, even more relaxing levels may be set. Aspects of the present invention require that there should be a plurality of relaxing levels, so that only the relaxing levels 1 and 2 may be set. The number of relaxing levels may also be set to be different according to the type of requirements.

Second Embodiment

A second embodiment of the present invention will be described below.

Arrangements of an engine controller according to the second embodiment of the present invention may be represented by the block diagram of FIG. 1 as in the first embodiment. The difference between this embodiment and the first embodiment lies in the method of varying the relaxing level of the restricting range A with time. The restricting range A is converted from requirements concerned with the time-integrated value of the control amount rather than the instantaneous value of the control amount. This holds true also with other embodiments to be described later and each of these other embodiments is also characterized by the method of varying the relaxing level of the restricting range A with time.

In this embodiment, as in the first embodiment, the relaxing levels of the restricting range A are determined by random numbers that take a value of 1, 2, or 3. A relaxing time tq is then determined according to the determined relaxing level n and the time-integrated value of an output value y(t) of the control amount. Specifically, in this embodiment, the relaxing time tq is expressed as a function of the time-integrated value of the output value y(t) of the control amount and the relaxing level n, as shown in the following equation.

$$tq=f(\int y(t)dt,n) \quad \text{[Expression 2]}$$

According to the method employed in this embodiment, the relaxing state of the restricting range A can be determined based on the time-integrated value of the control amount with which the requirement A is concerned. This precisely achieves relaxation from the restricting range A.

Third Embodiment

A third embodiment of the present invention will be described below.

In this embodiment, the relaxing level n is varied according to the time-integrated value of an evaluation index c(t) set for each relaxing level as shown in the following equation. The suffix "k" denotes the number of changes made in the relaxing level n.

$$n_{k+}=f(\int c(t)dt) \quad \text{[Expression 3]}$$

No special restrictions are imposed on the setting of the evaluation index c(t). For example, a constant c1 may be set for the relaxing level 1, a constant c2 may be set for the relaxing level 2, and a constant c3 may be set for the relaxing level 3. The function f in the above equation is such that, each time the time-integrated value of the evaluation index c(t) exceeds or falls below a predetermined threshold, an output thereof, specifically, the value of the relaxing level n is varied among 1, 2, and 3.

According to the method employed in this embodiment, future relaxing states of the restricting range A can be determined based on past relaxing states. This precisely achieves relaxation from the restricting range A.

Fourth Embodiment

A fourth embodiment of the present invention will be described below.

In this embodiment, the relaxing level n is varied according to the time-integrated value of an output value y(t) of the control amount as shown in the following equation. The suffix "k" denotes the number of changes made in the relaxing level n.

$$n_{k+1}=f(\int f(t)dt) \quad \text{[Expression 4]}$$

The function f in the above equation is such that, each time the time-integrated value of the output value y(t) of the control amount exceeds or falls below a predetermined threshold, an output thereof, specifically, the value of the relaxing level n is varied among 1, 2, and 3.

According to the method employed in this embodiment, the relaxing state of the restricting range A is automatically determined in a manner operatively associated with the time-integrated value of the control amount with which the requirement A is concerned. This precisely achieves relaxation from the restricting range A.

Fifth Embodiment

A fifth embodiment of the present invention will be described below.

In this embodiment, a subsequent relaxing level $n_{k+1}$ and subsequent change timing $t_{k+1,n}$ are determined as a function of current and past relaxing levels and change timing as shown in the following equation. In the equation given below, $t_{k,n}$, $t_{k-1,n}$, . . . , $t_{m,n}$ are the current and past change timing, and $n_{k,n}$, $n_{k-1}$, . . . , $n_m$ are the current and past change timing. A difference between the subsequent change timing $t_{k+1,n}$ and the current change timing $t_{k,n}$ is the relaxing time corresponding to the subsequent relaxing level $n_{k+1}$.

$$\lfloor t_{k+1,n}, n_{k+1}\rfloor=f(t_{k,n}, t_{k-1,n}, \ldots, t_{m,n}, n_k, n_{k-1}, \ldots, n_m) \quad \text{[Expression 5]}$$

According to the method employed in this embodiment, the subsequent relaxing level and relaxing time are determined based on each history of the relaxing level and relaxing time. This precisely achieves relaxation from the restricting range A.

Sixth Embodiment

A sixth embodiment of the present invention will be described below.

In this embodiment, a subsequent relaxing level $n_{k+1}$ and subsequent change timing $t_{k+1,n}$ are determined as a function of the time-integrated value of an output value y(t) of the control amount as shown in the following equation. A difference between the subsequent change timing $t_{k+1,n}$ and the current change timing $t_{k,n}$ is the relaxing time corresponding to the subsequent relaxing level $n_{k+1}$.

$$[t_{k+1,n}, n_{k+1}]=f(\int y(t)dt) \quad \text{[Expression 6]}$$

According to the method employed in this embodiment, the subsequent relaxing level and relaxing time are determined in a manner operatively associated with past variations in the control amount. This precisely achieves relaxation from the restricting range A.

Seventh Embodiment

A seventh embodiment of the present invention will be described below.

In this embodiment, a subsequent relaxing level $n_{k+1}$ and subsequent change timing $t_{k+1,n}$ are determined as a function of the current and past relaxing levels and change timing and the time-integrated value of an output value y(t) of the control amount as shown in the following equation. A difference between the subsequent change timing $t_{k+1,n}$ and the current change timing $t_{k,n}$ is the relaxing time corresponding to the subsequent relaxing level $n_{k+1}$.

$$[t_{k+1,n}, n_{k+1}]=f(t_{k,n}, t_{k-1,n}, \ldots, t_{m,n}, n_k, n_{k-1}, \ldots, n_m, \int y(t)dt) \quad \text{[Expression 7]}$$

According to the method employed in this embodiment, the subsequent relaxing level and relaxing time are determined based on past relaxing states of the restricting range A and past variations in the control amount. This precisely achieves relaxation from the restricting range A.

Eighth Embodiment

An eighth embodiment of the present invention will be described below with reference to FIG. 3.

Figure 3:
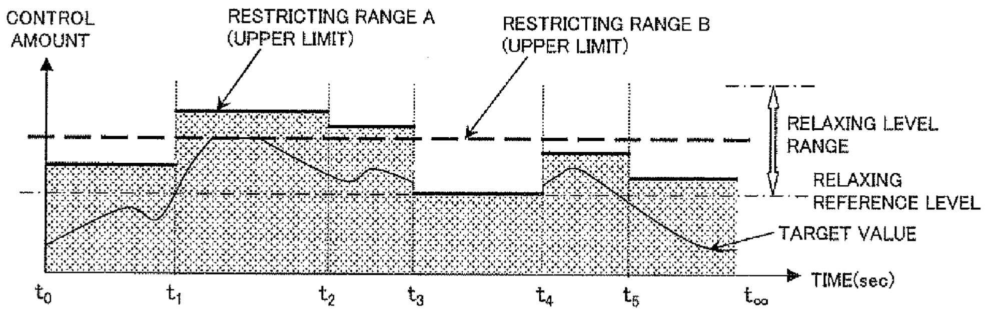
FIG. 3 is a diagram for illustrating the method of determining a restricting range adopted in an eighth embodiment of the present invention.

In this embodiment, the relaxing level of the restricting range A is selected not from among a plurality of relaxing levels set discretely, but from a relaxing level range having a continuous distribution as shown in FIG. 3. The relaxing level range is a finite range set on a side more relaxed than a predetermined relaxing reference level. The relaxing reference level corresponds to the most stringent restricting level when the requirement A is expressed by the instantaneous value of the control amount. This embodiment uses random numbers to determine the relaxing level as in the first embodiment. The random numbers used in this embodiment are, however, uniform random numbers falling within the range from 0 to 1 and the relaxing level is assigned to each value within this range.

In addition, a relaxing time is set for each relaxing level as in the embodiment. Since the relaxing level is continuous, the relaxing time is also a continuous distribution. The restricting range A is held at a determined relaxing level for a period of time through which the relaxing time lapses. After a lapse of the relaxing time, the current relaxing level is varied to the subsequent relaxing level and the relaxing time is set again.

In this embodiment, the relaxing level of the restricting range A is varied with time by using the method of the first embodiment. Each of the methods of the second through seventh embodiments may nonetheless be used as the method of changing the continuous relaxing level as in this embodiment with time. Specifically, as in the second embodiment, the relaxing level may be determined by random numbers, the relaxing time may be determined according to the determined relaxing level and the time-integrated value of the output value of the control amount, and the restricting range A may be held at the determined relaxing level for a period of the determined relaxing time. Alternatively, as in the third embodiment, the relaxing level may be varied according to the time-integrated value of the evaluation index. Further alternatively, as in the fourth embodiment, the relaxing level may be varied according to the time-integrated value of the output value of the control amount. Still further alternatively, as in the fifth embodiment, the subsequent relaxing level and relaxing time may be determined based on each history of the relaxing level and relaxing time. Still further alternatively, as in the sixth embodiment, the subsequent relaxing level and relaxing time may be determined based on the time-integrated value of the output value of the control amount. Still further alternatively, as in the seventh embodiment, the subsequent relaxing level and relaxing time may be determined based on each history of the relaxing level and relaxing time and the time-integrated value of the output value of the control amount.

Ninth Embodiment

A ninth embodiment of the present invention will be described below with reference to FIG. 4.

Figure 4:
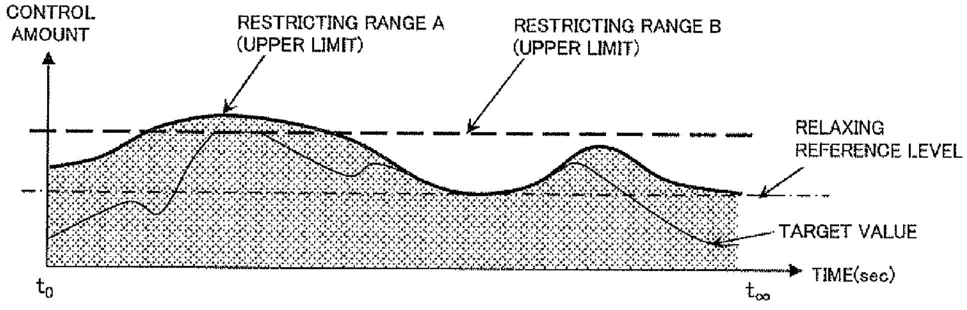
FIG. 4 is a diagram for illustrating the method of determining a restricting range adopted in a ninth embodiment of the present invention.

This embodiment is characterized in that, instead of the relaxing level or the relaxing time of the restricting range A being calculated each time, the relaxing level of the restricting range A is continuously varied with time according to a schedule prepared in advance as shown in FIG. 4. Specifically, a scheduling coefficient P(t) that takes a continuous value and depends solely on time is determined in advance and the relaxing level of the restricting range A is determined by multiplying a predetermined relaxing reference level by the scheduling coefficient P(t).

According to the method employed in this embodiment, the restricting range A can be continuously varied with time, while a calculating load on the engine controller is kept substantially low.

Tenth Embodiment

A tenth embodiment of the present invention will be described below.

In this embodiment, the relaxing level of the restricting range A is continuously varied with time according to a schedule prepared in advance as in the ninth embodiment. The schedule is not, however, fixed, but is updated according to a controlled state of the engine. In this embodiment, therefore, a scheduling coefficient P(x(t)) that depends on an engine controlled state x(t) is used. The controlled state x(t) as the term is herein used refers to a concept that includes the output value y(t) of the control amount. A predetermined relaxing reference level is multiplied by the scheduling coefficient P(x(t)), which determines the relaxing level of the restricting range A.

According to the method employed in this embodiment, the relaxing state of the restricting range A is determined according to the engine controlled state. This precisely achieves relaxation from the restricting range A.

Miscellaneous

Preferred embodiments of the present invention have been presented for the purposes of illustration and description. It is not intended to be exhaustive or to limit the invention to the precise forms disclosed. It will be understood by those skilled in the art that various changes in form and detail may be made therein without departing from the spirit and scope of the invention. For example, in each of the embodiments described above, the restricting range A is varied with time toward the relaxing direction with reference to the restricting range that is the most stringent when the requirement A is expressed by the instantaneous value of the control amount. The restricting range A may, however, be varied with time toward the stringent direction with reference to the restricting range that is the most relaxed permissible in terms of the specific detail of the requirement A.

In addition, each of the embodiments described above has been described for two limited types of requirements, the requirements A and B, to be converted to the restricting ranges in order to clarify characteristic points of the present invention. However, in the present invention, the number of requirements to be converted to the restricting ranges is not limited to two. Three or more types of requirements concerned with engine performance may be acquired and the final restricting range may be determined based on overlaps between three or more restricting ranges as converted from the requirements. The requirements to be acquired may also include a plurality of requirements concerned with the time-integrated value of the control amount. Further, all of the requirements to be acquired may be concerned with the time-integrated value of the control amount.

The invention claimed is:

1. A control apparatus for controlling an internal combustion engine according to a target value of a control amount, comprising:

means for acquiring various types of requirements concerned with performance of the internal combustion engine and setting a restricting range of a value of the control amount according to a specific detail of each of the requirements;

means for determining a final restricting range based on overlaps between restricting ranges set for the respective requirements; and means for determining the target value of the control amount within the final restricting range, wherein the means for setting a restricting range comprises restricting range varying means for varying the set restricting range with time for a specific requirement concerned with a time-integrated value of the control amount rather than an instantaneous value of the control amount.

2. The control apparatus for an internal combustion engine according to claim 1, wherein:

the restricting range varying means varies with time a restricting level that specifies the restricting range.

3. The control apparatus for an internal combustion engine according to claim 2, wherein:

the restricting range varying means determines a restricting level by random numbers and, for a holding time predetermined for each of restricting levels, holds the restricting range at the determined restricting level.

4. The control apparatus for an internal combustion engine according to claim 2, wherein:

the restricting range varying means determines a restricting level by random numbers, determines a holding time according to the determined restricting level and a time-integrated value of an output value of the control amount, and holds the restricting range at the determined restricting level for the determined holding time.

5. The control apparatus for an internal combustion engine according to claim 2, wherein:

the restricting range varying means varies the restricting level according to a time-integrated value of an evaluation index set according to the restricting level.

6. The control apparatus for an internal combustion engine according to claim 2, wherein:

the restricting range varying means varies the restricting level according to a time-integrated value of an output value of the control amount.

7. The control apparatus for an internal combustion engine according to claim 2, wherein:

the restricting range varying means determines a subsequent restricting level and a holding time thereof based on each history of the restricting level and the holding time thereof.

8. The control apparatus for an internal combustion engine according to claim 2, wherein:

the restricting range varying means determines a subsequent restricting level and a holding time thereof based on a time-integrated value of an output value of the control amount.

9. The control apparatus for an internal combustion engine according to claim 2, wherein:

the restricting range varying means determines a subsequent restricting level and a holding time thereof based on each history of the restricting level and the holding time thereof, and a time-integrated value of an output value of the control amount.

10. The control apparatus for an internal combustion engine according to claim 2, wherein:

the restricting range varying means varies the restricting level according to a schedule prepared in advance.

11. The control apparatus for an internal combustion engine according to claim 2, wherein:

the restricting range varying means updates a schedule of the restricting level according to a controlled state of the internal combustion engine and varies the restricting level according to the schedule.

12. The control apparatus for an internal combustion engine according to claim 2, wherein:

the restricting range varying means varies the restricting level with the restricting level being selected from among a plurality of restricting level candidates set discretely.

13. The control apparatus for an internal combustion engine according to claim 2, wherein:

the restricting range varying means varies the restricting level within a restricting level range set continuously.

14. The control apparatus for an internal combustion engine according to claim 1, wherein:

the restricting range varying means relaxes the restricting range with time with reference to a most stringent restricting range determined based on a specific detail of the specific requirement.

15. A control apparatus for controlling an internal combustion engine according to a target value of a control amount, comprising:

a unit which acquires various types of requirements concerned with performance of the internal combustion engine and sets a restricting range of a value of the control amount according to a specific detail of each of the requirements;

a unit which determines a final restricting range based on overlaps between restricting ranges set for the respective requirements; and a unit which determines the target value of the control amount within the final restricting range, wherein the unit which sets a restricting range comprises a unit which varies the set restricting range with time for a specific requirement concerned with a time-integrated value of the control amount rather than an instantaneous value of the control amount.

* * * * *